(12) United States Patent
Abe

(10) Patent No.: US 11,422,433 B2
(45) Date of Patent: Aug. 23, 2022

(54) ELECTRONIC DEVICE AND SHUTTER

(71) Applicant: FUJITSU CLIENT COMPUTING LIMITED, Kanagawa (JP)

(72) Inventor: Takashi Abe, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 17/091,340

(22) Filed: Nov. 6, 2020

(65) Prior Publication Data
US 2021/0200062 A1    Jul. 1, 2021

(30) Foreign Application Priority Data

Dec. 27, 2019   (JP) .............................. JP2019-239786

(51) Int. Cl.
*G03B 11/04*       (2021.01)
*G06F 1/16*        (2006.01)

(52) U.S. Cl.
CPC .......... *G03B 11/043* (2013.01); *G06F 1/1656* (2013.01); *G06F 1/1686* (2013.01)

(58) Field of Classification Search
CPC .......... G06F 1/1686; G03B 9/02; G03B 9/04; G03B 9/08; G03B 11/041; G03B 11/043
See application file for complete search history.

(56) References Cited

U.S. PATENT DOCUMENTS

| | | | | |
|---|---|---|---|---|
| 2006/0051085 A1* | 3/2006 | Okumura | ................ | G03B 9/04 396/505 |
| 2013/0088639 A1* | 4/2013 | Mundt | ................ | H04N 5/2251 348/372 |
| 2016/0088264 A1* | 3/2016 | Freeze | ................ | H04N 5/2252 348/143 |
| 2019/0033686 A1* | 1/2019 | Kinoshita | ............. | G06F 1/1686 |
| 2019/0246014 A1* | 8/2019 | Huang | ................. | G06F 1/1686 |

FOREIGN PATENT DOCUMENTS

JP    2019-028157 A    2/2019

OTHER PUBLICATIONS

Notification of Reasons for Refusal issued in corresponding Japanese Application No. 2019-239786 dated Mar. 24, 2020 (8 pages).

* cited by examiner

*Primary Examiner* — Noam Reisner
(74) *Attorney, Agent, or Firm* — Osha Bergman Watanabe & Burton LLP

(57) ABSTRACT

An electronic device includes a container, a camera, a sheet, and a shutter support. The camera is accommodated in the container and includes a lens on which light is to be incident from an outside of the container. The sheet covers the camera from a light incident side of the lens and allows the light to be incident on the lens. The shutter support is included in the container, and supports a shutter while attached to the container such that the shutter is slidable between a closed position and an open position. In the closed position the shutter is located between the camera and the sheet to cover the light incident side of the lens and shield the lens from the light. In the open position the shutter exposes the lens.

10 Claims, 10 Drawing Sheets

ELECTRONIC DEVICE AND SHUTTER

CROSS-REFERENCE TO RELATED APPLICATIONS

This application is based upon and claims the benefit of priority from Japanese Patent Application No. 2019-239786, filed Dec. 27, 2019, the entire contents of which are incorporated herein by reference.

BACKGROUND

Technical Field

An embodiment described herein relates generally to an electronic device and a shutter.

Description of the Related Art

Conventionally, electronic devices are known, which include a container, a camera accommodated in the container, and a shutter slidable between two positions to cover the lens of the camera and expose the lens to outside the container.

It is beneficial to apply such an electronic device, for example, to build-to-order (BTO) manufacturing for allowing the user to select attachment or non-attachment of a camera.

It is thus preferable to provide an electronic device of a novel structure that is readily applicable to build-to-order (BTO) manufacturing for allowing selection of attachment or non-attachment of a shutter, and provide the shutter.

SUMMARY

According to one aspect of this disclosure an electronic device includes a container; a camera including a lens on which light is to be incident from an outside of the container, the camera accommodated in the container; a sheet that covers the camera from a light incident side of the lens and allows the light to be incident on the lens; and a shutter support included in the container. The shutter support supports a shutter while attached to the container such that the shutter is slidable between a closed position and an open position. In the closed position the shutter is located between the camera and the sheet to cover the light incident side of the lens and shield the lens from the light. In the open position the shutter exposes the lens.

DETAILED DESCRIPTION

The following will describe an embodiment of an electronic device and a shutter in detail with reference to the accompanying drawings. Features of the embodiments below and actions and effects attained by such features are presented for illustrative purpose only. The embodiments are attainable by features other than those described in this disclosure. The embodiments can achieve at least one of various effects including derivative effects attained by the features.

Throughout this disclosure, ordinal numbers are used to merely distinguish elements, components, members, parts, areas, locations, positions, directions, and else, and are not intended to indicate order or priority.

Figure 1:
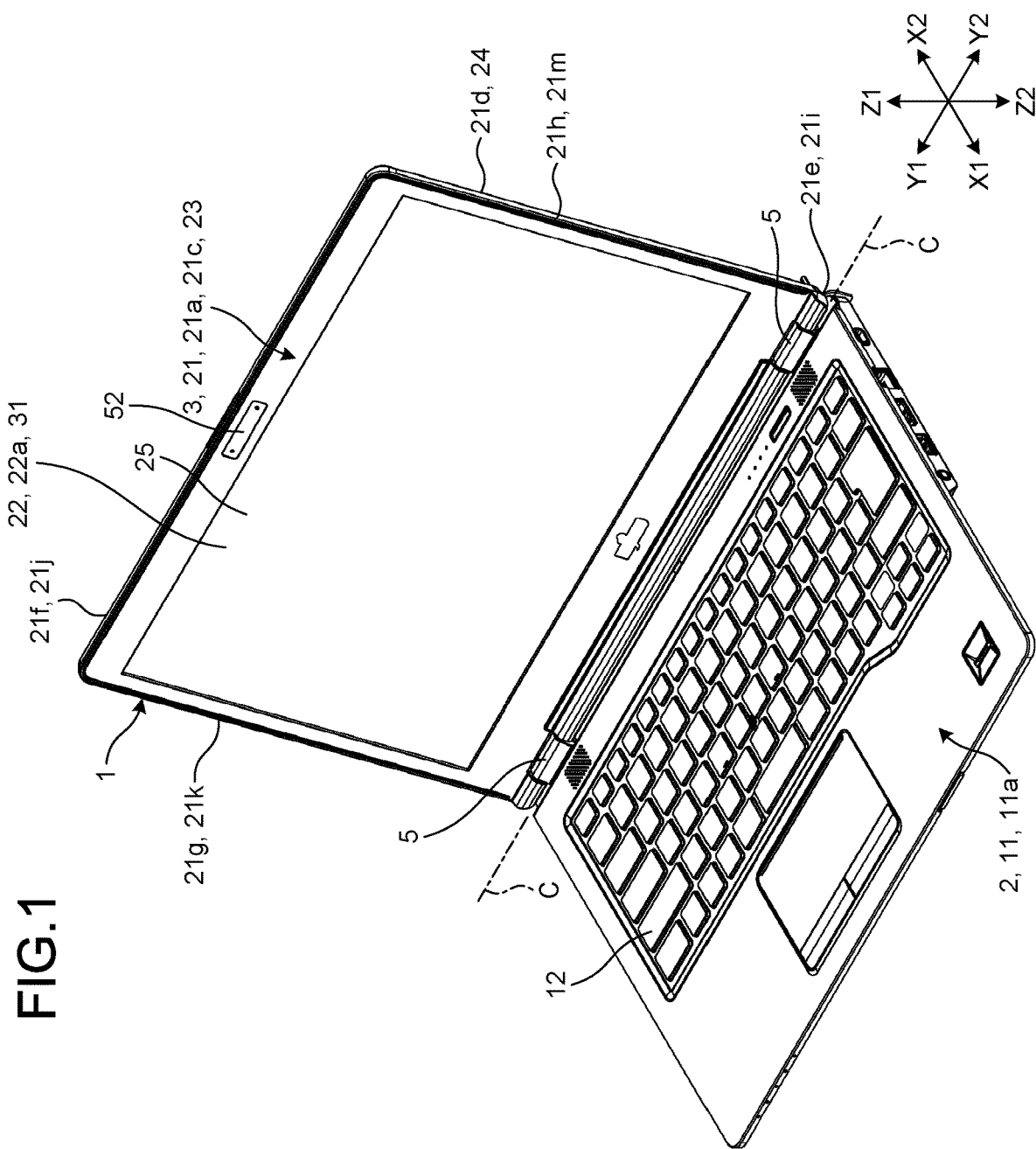
FIG. 1 is an exemplary perspective view of a front side of an electronic device in an expanded position according to an embodiment.

FIG. 1 is an exemplary perspective view of a front side of an electronic device in an expanded position according to an embodiment.

As illustrated in FIG. 1, the electronic device 1 represents, for example, a laptop or clamshell personal computer, and includes a first module 2 and a second module 3. The first module 2 is placed on a mount such as a desk, a rack, and a shelf, for example. The second module 3 is rotatably supported by the first module 2 around a rotational axis C with respect to the first module 2, and is movable between an expanded position (FIG. 1) and a closed position (not illustrated). Specifically, the second module 3 is coupled to the first module 2 through hinges 5. The electronic device 1 is not limited to such an example, and may be, for example, a desktop personal computer, a slate or tablet personal computer, a smartphone, a mobile phone, a video display, a television receiver, and a game machine.

In the present embodiment, directions are defined for the sake of convenience. X1 direction coincides with the forward direction of the first module 2. X2 direction is opposite to X1 direction and coincides with the rearward direction of the first module 2. Y1 direction is along the width (horizontal or longitudinal direction) of the first module 2. Y2 direction is opposite to Y1 direction. Y1 direction is also referred to as leftward and Y2 direction is also referred to rightward. Z1 direction coincides with the height (vertically upward) of the first module 2. Z2 direction is opposite to Z1 direction. X1 direction, Y1 direction, and Z1 direction are orthogonal to one another. X2 direction, Y2 direction, and Z2 direction are orthogonal to one another.

The first module 2 includes a first casing 11 and a keyboard 12 supported by the first casing 11. The keyboard 12 is supported by the first casing 11 so as to be operable from above. The first casing 11 accommodates a substrate (not illustrated). A plurality of electronic components (not illustrated) including a central processing unit (CPU), a read only memory (ROM), and a random access memory (RAM) are mounted on the substrate. Electronic circuitry of the electronic device 1 at least partially includes wiring set on the substrate and the electronic components mounted on the substrate.

The second module 3 includes a second casing 21, a display unit 22, and a touch panel 25. The display unit 22 is supported by the second casing 21 such that a display screen 22a is viewable from the front. The touch panel 25 is supported by the second casing 21 while covering the display screen 22a of the display unit 22. The second casing 21 is an exemplary container.

In the expanded position of the second module 3 (second casing 21) (FIG. 1), an upper surface 11a of the first casing 11 and the keyboard 12 do not oppose a front surface 21a of the second casing 21 and the display screen 22a of the display unit 22, and the upper surface 11a of the first casing 11, the keyboard 12, the front surface 21a of the second casing 21, and the display screen 22a of the display unit 22 are exposed. The front surface 21a and a rear surface 21b of the second casing 21 face forward and rearward, respectively.

In the closed position (not illustrated) of the second module 3 (second casing 21), the upper surface 11a of the first casing 11 and the keyboard 12 oppose the front surface 21a of the second casing 21 and the display screen 22a of the display unit 22.

Next, the second module 3 will be described in detail. In the following, the second module 3 is set in a posture that the display screen 22a faces the X1 direction unless otherwise specified.

As illustrated in FIG. 1, the second casing 21 has a flat, substantially rectangular parallelepiped shape. The second casing 21 includes, for example, a plurality of walls such as a front wall 21c, a rear wall 21d, a lower wall 21e, an upper wall 21f, a left wall 21g, and a right wall 21h.

The front wall 21c includes the front surface 21a and the rear wall 21d includes the rear surface 21b.

The lower wall 21e and the upper wall 21f form a bottom end 21i and a top end 21j of the second casing 21, respectively. The top end 21j is spaced from the rotational axis C. The bottom end 21i is closer to the rotational axis C relative to the top end 21j.

The left wall 21g and the right wall 21h form a left end 21k and a right end 21m of the second casing 21, respectively.

The second casing 21 includes a combination of members including a front cover 23 and a rear cover 24. The front cover 23 includes a part of the front wall 21c and has a rectangular frame shape. The rear cover 24 includes at least the rear wall 21d. The front cover 23 and the rear cover 24 are coupled together with tabs or screws, for example.

The touch panel 25 is fixed to the front surface 21a of the front cover 23. The touch panel 25 is fixed to the front surface 21a of the front cover 23 by adhesion with a double-sided adhesive tape, for example. The touch panel 25 has a flat, substantially rectangular parallelepiped shape. The touch panel 25 may be omissible.

A display 31 is, for example, a liquid crystal display. The display 31 is not limited to the liquid crystal display. For example, the display 31 may be an organic electroluminescence (EL) display.

Figure 2:
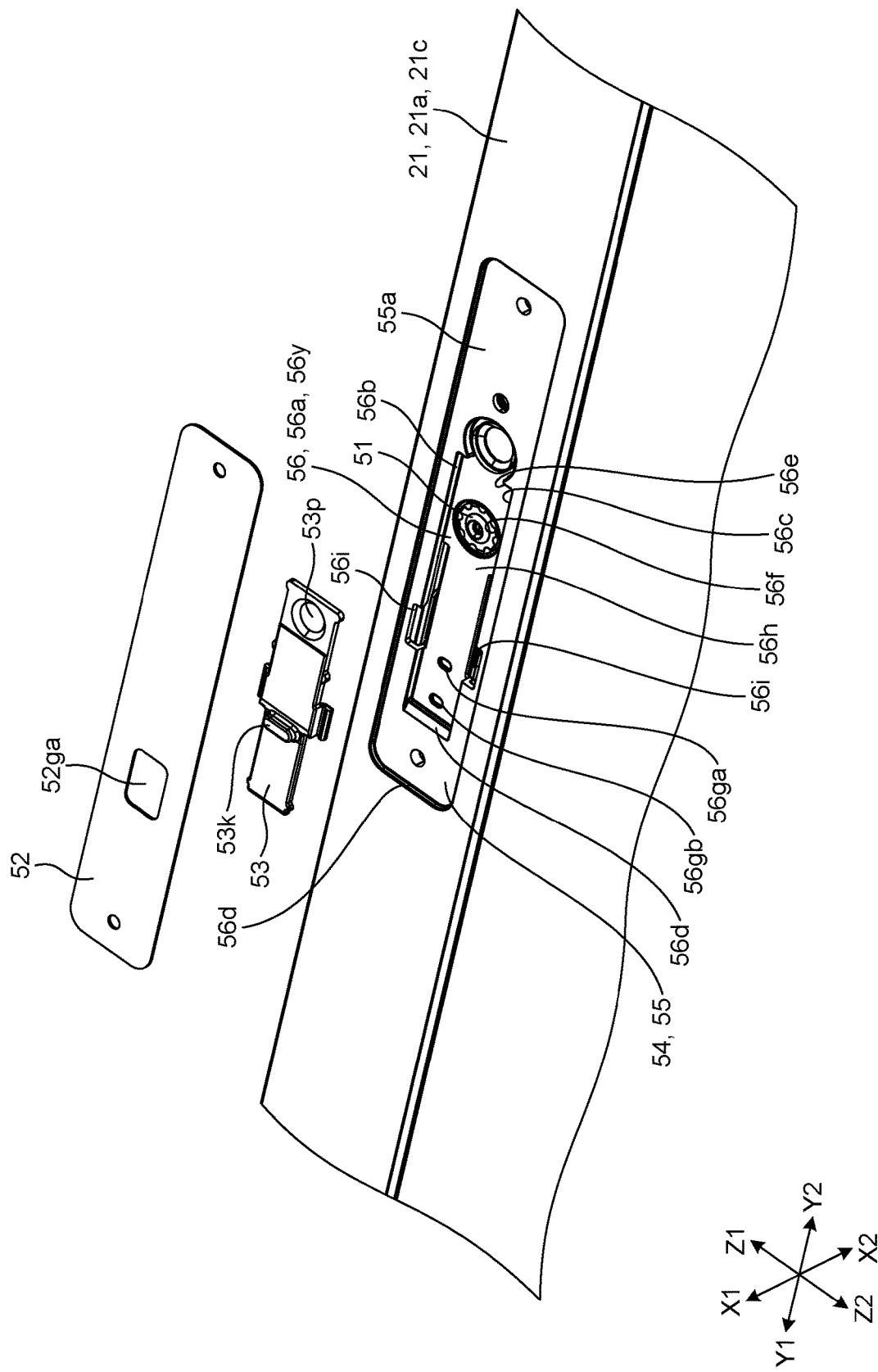
FIG. 2 is an exemplary exploded perspective view of the front side of a top end of a second module in the embodiment.
Figure 3:
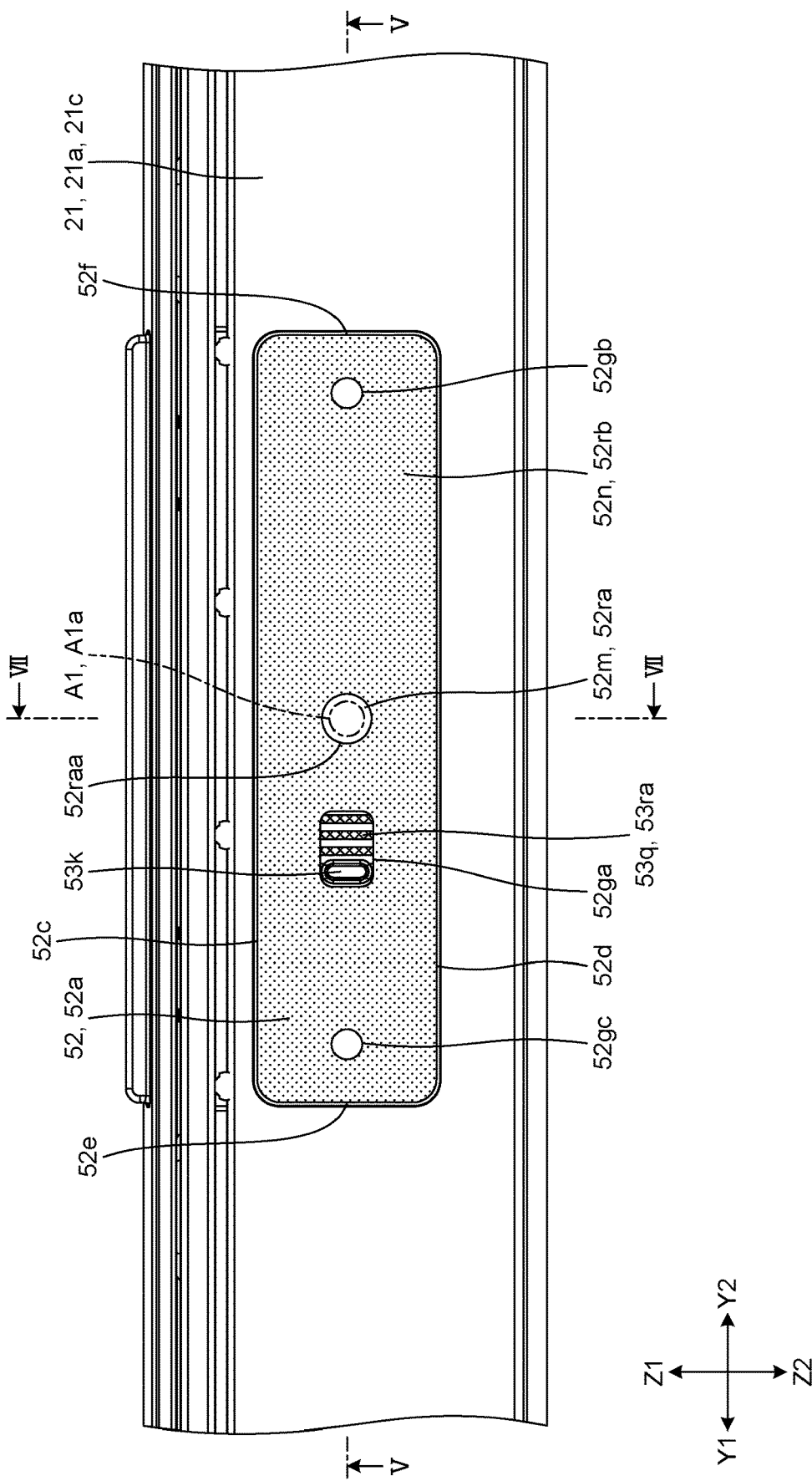
FIG. 3 is an exemplary front view of the top end of the second module in the embodiment with a shutter located at an open position.
Figure 4:
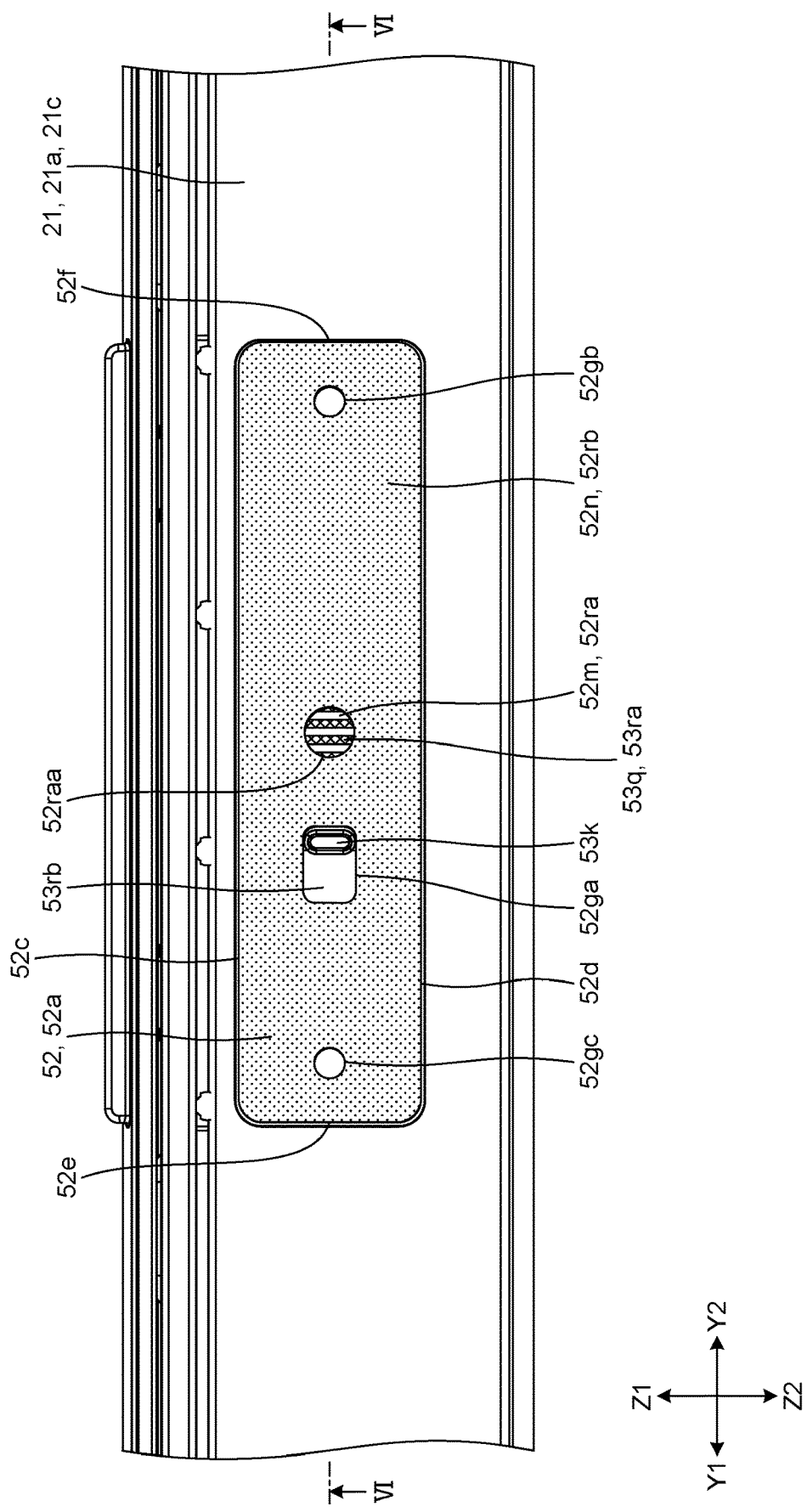
FIG. 4 is an exemplary front view of the top end of the second module in the embodiment with the shutter located at a closed position.
Figure 5:
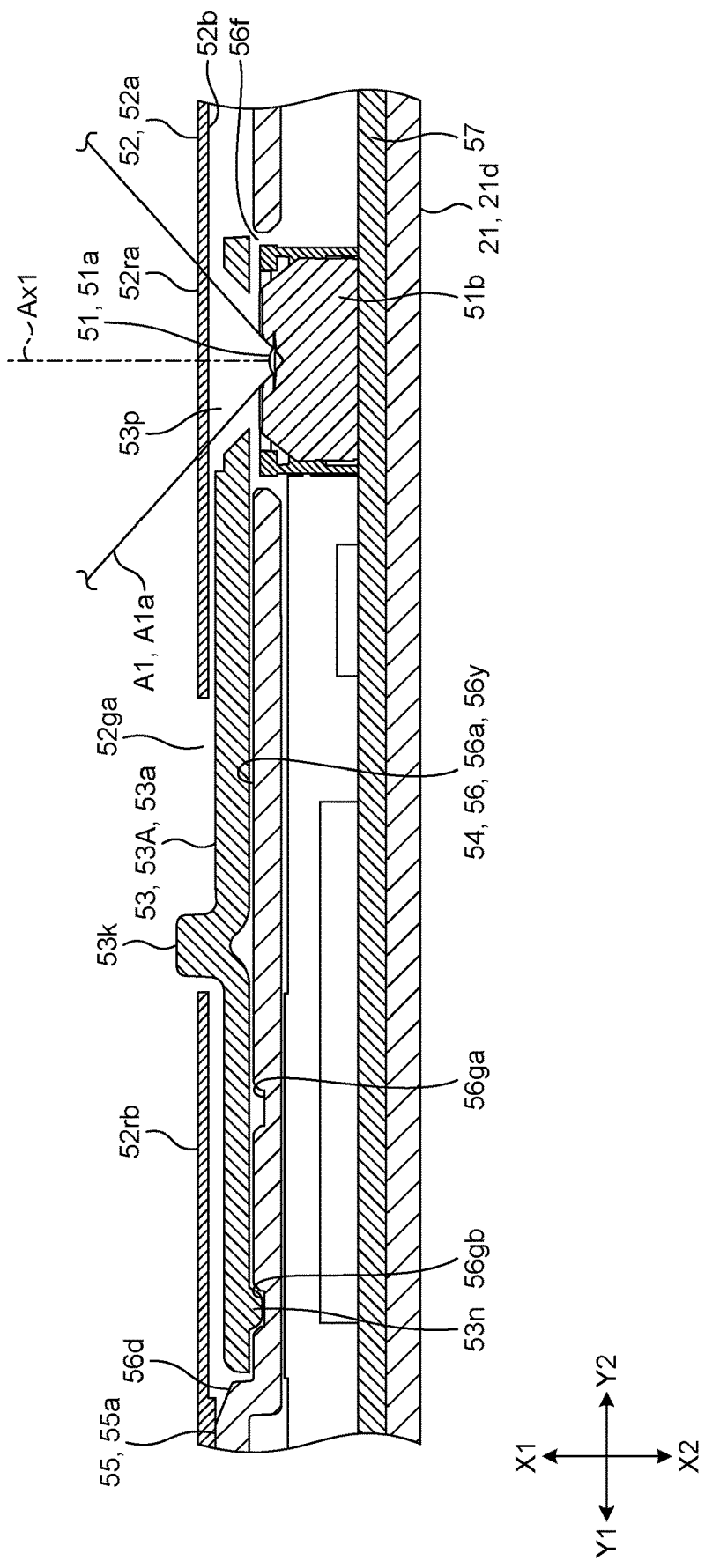
FIG. 5 is a sectional view of FIG. 3 taken along line V to V.
Figure 6:
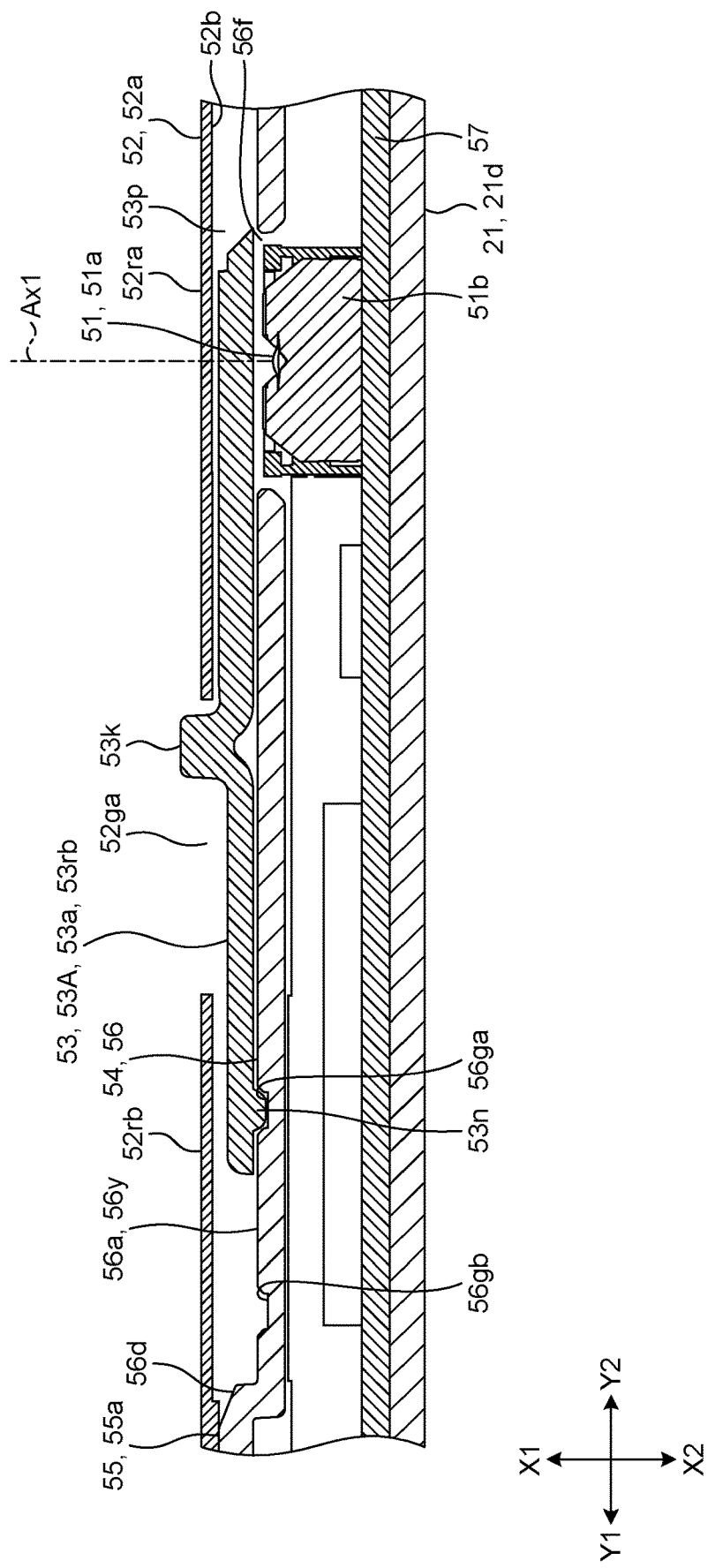
FIG. 6 is a sectional view of FIG. 4 taken along line VI to VI.
Figure 7:
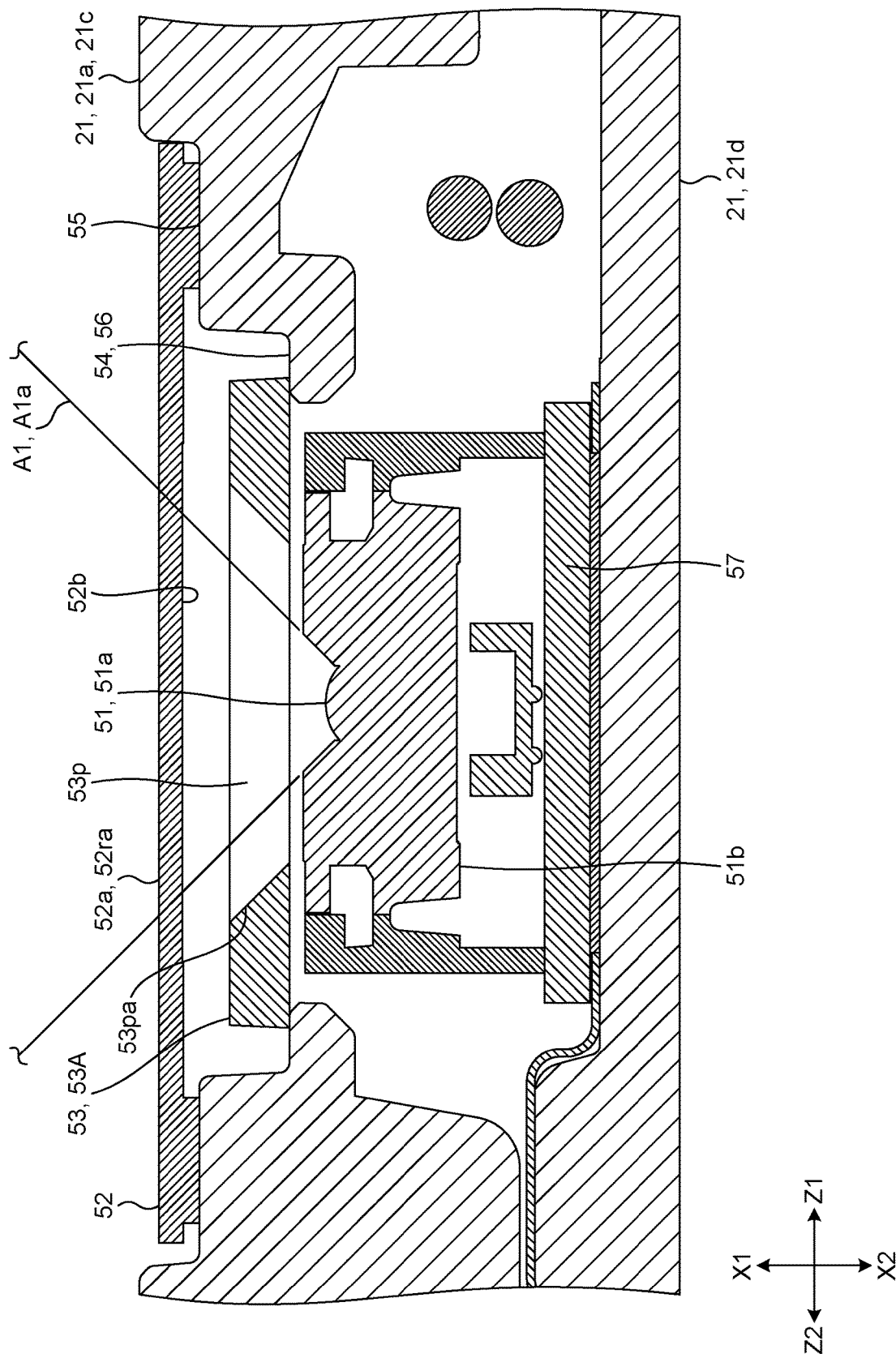
FIG. 7 is a sectional view of FIG. 3 taken along line VII to VII of FIG. 3.

FIG. 2 is an exemplary exploded perspective view of the front side of the top end 21j of the second module 3 in the embodiment. FIG. 3 is an exemplary front view of the top end 21j of the second module 3 in the embodiment with a shutter located at an open position. FIG. 4 is an exemplary front view of the top end 21j of the second module 3 in the embodiment with a shutter located at a closed position. FIG. 5 is a sectional view of FIG. 3 taken along line V to V. FIG. 6 is a sectional view of FIG. 4 taken along line VI to VI. FIG. 7 is a sectional view of FIG. 3 taken along line VII to VII.

Figure 8:
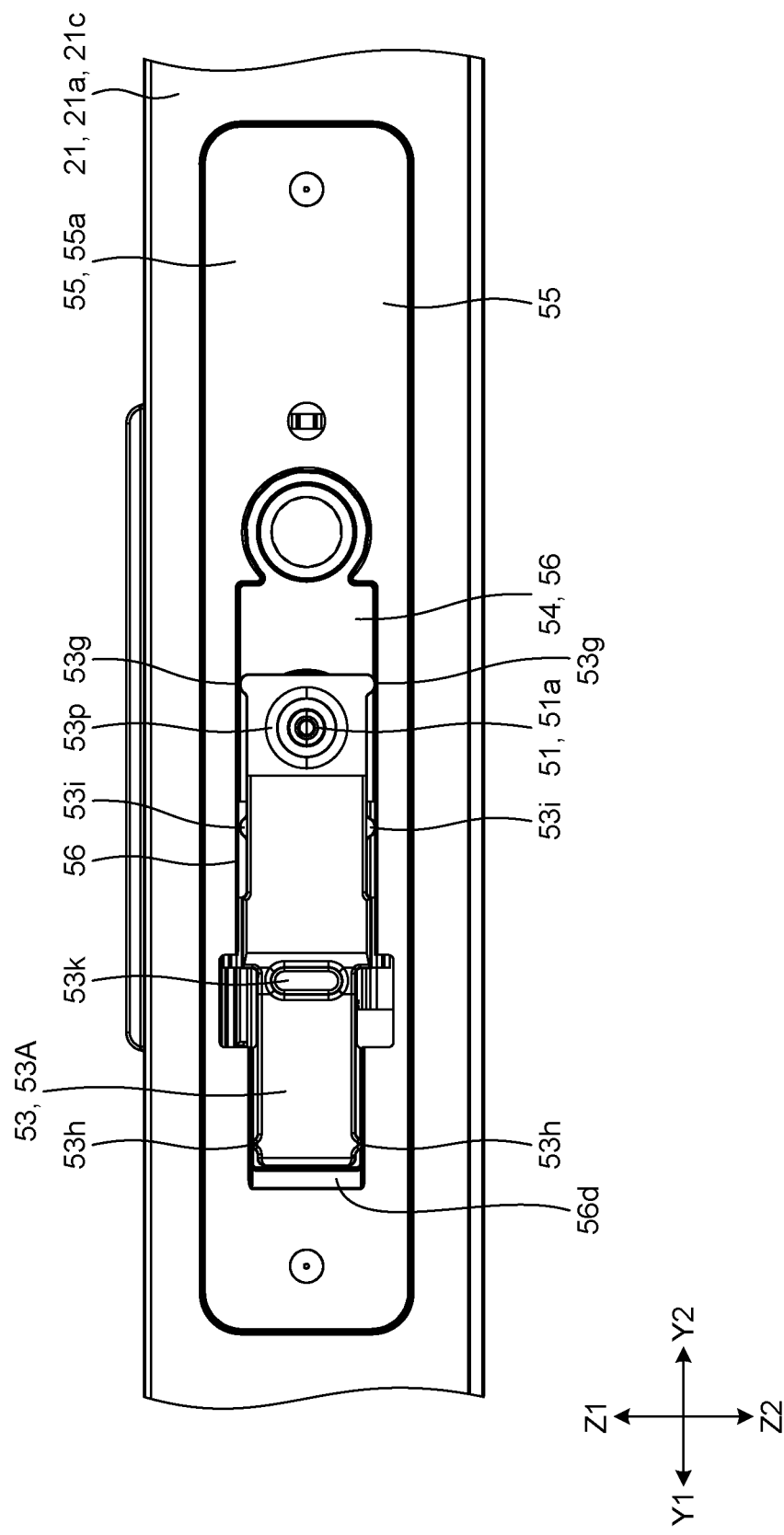
FIG. 8 is an exemplary front view of the top end of the second module in the embodiment with a sheet removed.

FIG. 8 is an exemplary front view of the top end 21j of the second module 3 in the embodiment with a sheet 52 removed.

As illustrated in FIG. 1 to FIG. 8, the second module 3 includes a camera 51, the sheet 52, the shutter 53, and a support 54. The second module 3 includes the camera 51, the sheet 52, the shutter 53, and the support 54 in the top end 21j. The support 54 is located on the front wall 21c. The camera 51 is accommodated in the second casing 21. A lens 51a of the camera 51 is exposed from a through hole 56f (FIG. 5) in the support 54. The sheet 52 and the shutter 53 are accommodated in and supported by the support 54 (FIG. 5 to FIG. 7). The sheet 52 is located in the X1 direction of the shutter 53. The sheet 52 works to cover the shutter 53 and the camera 51 from the X1 direction. The shutter 53 is slidably supported by the support 54 in the Y1 direction and the Y2 direction.

As illustrated in FIG. 2 and FIG. 5, the support 54 includes a sheet support 55 that supports the sheet 52 while accommodated, and a shutter support 56 that supports the shutter 53 while accommodated.

The sheet support 55 is in the form of a recess recessed from the front surface 21a in the X2 direction. The sheet support 55 has a bottom surface 55a facing the X1 direction.

The shutter support 56 slidably supports the shutter 53 between the closed position (FIG. 4 and FIG. 6) and the open position (FIG. 3 and FIG. 5). In the closed position the shutter 53 is located between the camera 51 and the sheet 52 to cover a light incident side (X1-directional side) of the lens 51a to shield the lens 51a from light. In the open position the shutter 53 exposes the lens 51a. The shutter 53 slides in the Y1 direction and the Y2 direction. Hereinafter, the sliding direction of the shutter 53 may be simply referred to as a sliding direction.

As illustrated in FIG. 2 and other drawings, the shutter support 56 is in the form of a recess recessed from the bottom surface 55a in the X2 direction. The shutter support 56 has a bottom surface 56a, an upper surface 56b, a lower surface 56c, a left surface 56d, and a right surface 56e. The bottom surface 56a faces the X1 direction. The upper surface 56b, the lower surface 56c, the left surface 56d, and the right surface 56e extend in the X1 direction from the outer edge of the bottom surface 56a. The upper surface 56b extends in the Y1 direction, facing the Z2 direction. The lower surface 56c is located in the Z2 direction of the upper surface 56b, and extends in the Y1 direction, facing the Z1 direction. The left surface 56d faces the Y2 direction and the X1 direction. That is, the left surface 56d is inclined with respect to the bottom surface 56a. The left surface 56d extends in the X1 direction. The right surface 56e is located in the Y2 direction of the left surface 56d, and extends in the X1 direction, facing the Y1 direction. The bottom surface 56a, the upper surface 56b, the lower surface 56c, the left surface 56d, and the right surface 56e define a concave surface 56y. The concave surface 56y forms a recess 56h. Due to the inclination of the left surface 56d, the recess 56h is widened as further away from the bottom surface 56a. The upper surface 56b, the lower surface 56c, the left surface 56d, and the right surface 56e are exemplary lateral surfaces. The left surface 56d is an exemplary inclined surface.

The bottom surface 56a of the shutter support 56 is provided with a through hole 56f and two recesses 56ga and 56gb. The recess 56ga is located in the Y1 direction of the through hole 56f, and the recess 56gb is located in the Y1 direction of the recess 56ga. The upper surface 56b and the lower surface 56c are provided with through holes 56i.

As illustrated in FIG. 5 to FIG. 7, the camera 51 includes the lens 51a on which light is incident from the second casing 21, and a body 51b to which the lens 2a is fixed. The body 51b contains an image sensor (not illustrated) inside. The image sensor receives the light through the lens 51a. The camera 51 is mounted on a board 57.

Figure 9:
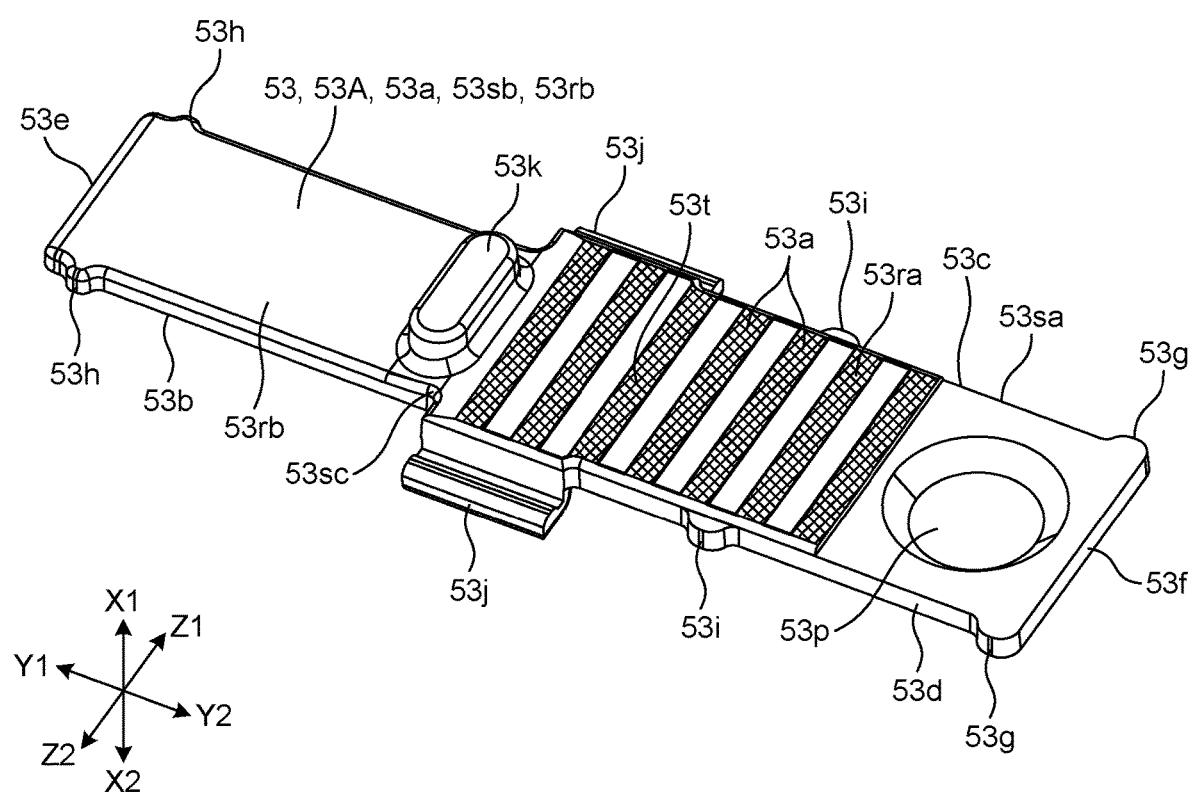
FIG. 9 is an exemplary perspective view of a front side of the shutter in the embodiment.
Figure 10:
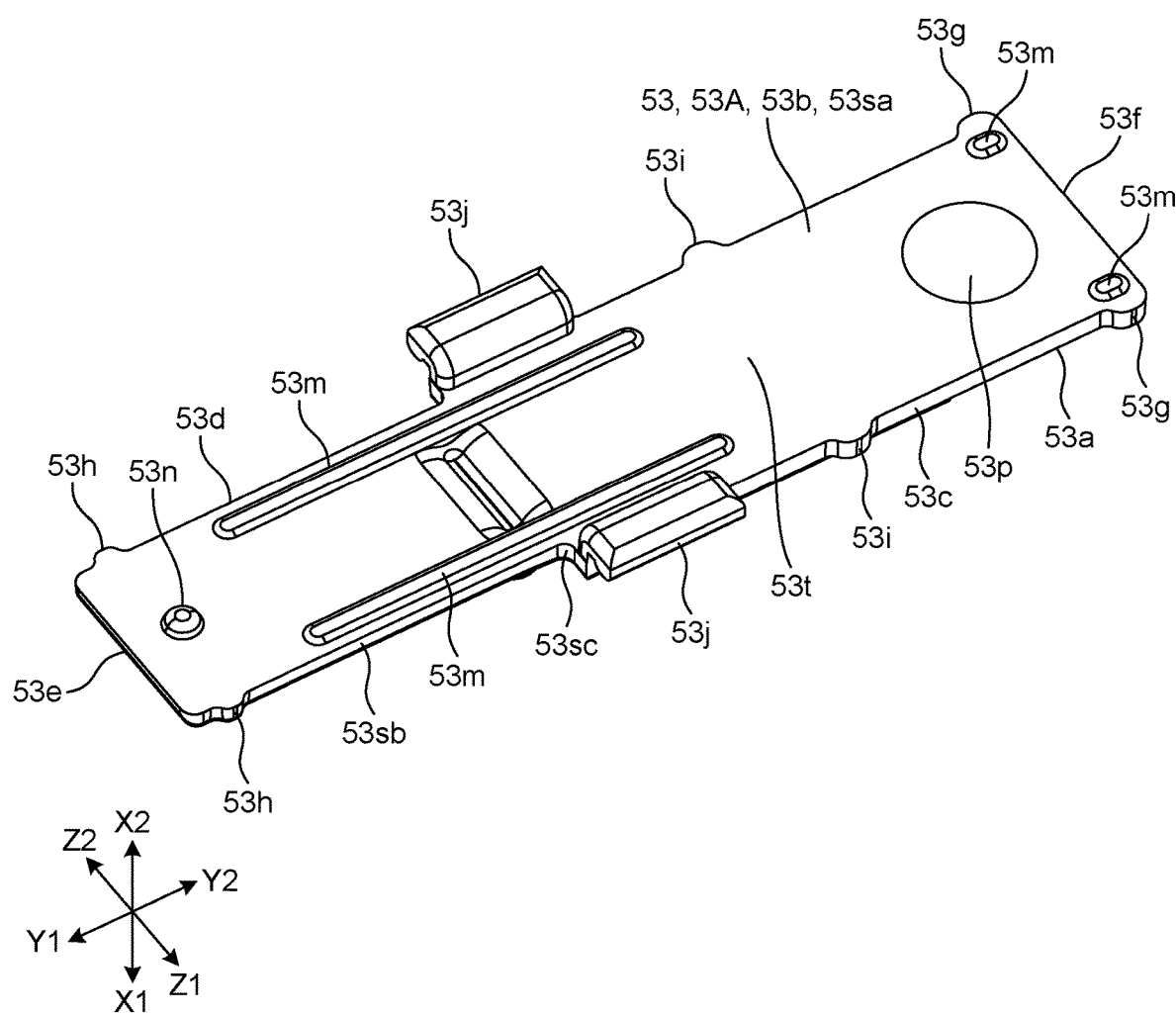
FIG. 10 is an exemplary perspective view of a rear side of the shutter in the embodiment.

FIG. 9 is an exemplary perspective view of the front side of the shutter 53 in the embodiment, and FIG. 10 is an exemplary perspective view of the rear side of the shutter 53 in the embodiment.

As illustrated in FIG. 9 and FIG. 10, the shutter 53 includes a base 53A. The base 53A has a strip plate shape with long sides in the Y1 direction and short sides in the Z1 direction. That is, the length of the base 53A is in the sliding direction of the shutter 53. The thickness of the base 53A is in the X1 direction, i.e., an optical axis Axl of the camera 51 (FIG. 5).

The base 53A has a top end 53c, a bottom end 53d, a left end 53e, and a right end 53f. The top end 53c is an end in the Z1 direction and the bottom end 53d is an end in the Z2 direction. That is, the top end 53c and the bottom end 53d oppose each other. The top end 53c and the bottom end 53d extend in the Y1 direction. The left end 53e is an end in the Y1 direction and the right end 53f is an end in the Y2 direction. That is, the left end 53e and the right end 53f oppose each other. The left end 53e and the right end 53f extend in the Z1 direction. The shutter 53 is made of a synthetic resin material, for example.

The base 53A has a front surface 53a facing the X1 direction and a rear surface 53b facing the X2 direction and opposite to the front surface 53a. The front surface 53a and the rear surface 53b extend across the top end 53c and the bottom end 53d and across the left end 53e and the right end 53f.

The shutter 53 is provided with a pair of first protrusions 53g, a pair of second protrusions 53h, and a pair of third protrusions 53i. The pair of first protrusions 53g is located at one end with respect to a central part 53t of the base 53A in the sliding direction, and extends away from each other from the base 53A along the short side of the base 53A to contact with the shutter support 56 (FIG. 8). The pair of second protrusions 53h is located at the other end with respect to the central part 53t in the sliding direction, and extends away from each other from the base 53A along the short side of the base 53A to contact with the shutter support 56 (FIG. 8). The pair of third protrusions 53i is spaced from the shutter support 56.

The shutter 53 is supported by the shutter support 56 through the pair of first protrusions 53g and the pair of second protrusions 53h in the Y1 direction and the Y2 direction (intersecting direction) and slidable between the closed position in which the base 53A is located between the camera 51 and the sheet 52 to cover the incident side of the lens 51a to shield the lens 51a from light, and the open position in which the base 53A exposes the lens 51a.

The shutter 53 includes a pair of tabs 53j. The pair of tabs 53j is inserted into the pair of through holes 56i (FIG. 2) of the shutter support 56 and hangs from the shutter support 56. Thereby, the shutter 53 is prevented from coming off the shutter support 56.

As illustrated in FIG. 9, the shutter 53 includes an operational member 53k. The operational member 53k protrudes from the front surface 53a in the X1 direction.

As illustrated in FIG. 10, the shutter 53 further includes sliders 53m and a positioning protrusion 53n. The sliders 53m protrude from the rear surface 53b and slide on the bottom surface 55a of the shutter support 56.

The positioning protrusion 53n is fitted into the recess 56ga in the closed position (FIG. 6) of the shutter 53, and is fitted into the recess 56gb in the open position (FIG. 5) of the shutter 53.

As illustrated in FIG. 9 and FIG. 10, the base 53A is provided with a through hole 53p. In the open position of the shutter 53, the through hole 53p is located on the incident side of the lens 51a and faces a transparent region 52ra of the sheet 52 (FIG. 5), as will be described below. The through hole 53p increases in diameter as further away from the lens 51a. An outer periphery 53pa of the through hole 53p surrounds an outer periphery Ala of an imaging region A1 (FIG. 7).

As illustrated in FIG. 9, the base 53A includes regions 53ra on which stripes 53q are printed and a region 53rb with no stripes 53q printed thereon. The stripes 53q are applied by mesh hatching.

The base 53A further includes a first part 53sa and a second part 53sb juxtaposed to each other in the Y1 direction (longitudinal direction of the base 53A), and a connection 53sc between the first part 53sa and the second part 53sb. The second part 53sb is thinner in thickness than the first part 53sa. The first part 53sa is located in the Y2 direction of the operational member 53k and the second part 53sb is located in the Y1 direction of the operational member 53k. The second part 53sb is provided with the positioning protrusion 53n. The connection 53sc is provided with the operational member 53k.

As illustrated in FIG. 3 to FIG. 6, the sheet 52 covers the camera 51 from the light incident side (X1-directional side) of the lens 51a and allows the light to be incident on the lens 51a.

The sheet 52 has a strip plate shape with long sides in the Y1 direction and the Y2 direction and short sides in the Z1 direction and the Z2 direction.

As illustrated in FIG. 3, the sheet 52 has a top end 52c, a bottom end 52d, a left end 52e, and a right end 52f. The top end 52c is an end in the Z1 direction and the bottom end 52d is an end in the Z2 direction. That is, the top end 52c and the bottom end 52d are opposite to each other. The top end 52c and the bottom end 52d extend in the Y1 direction. The left end 52e is an end in the Y1 direction and the right end 52f is an end in the Y2 direction. That is, the left end 52e and the right end 52f are opposite to each other. The left end 52e and the right end 52f extend in the Z1 direction.

The sheet 52 has a front surface 52a facing the X1 direction and a rear surface 52b (FIG. 4) opposite the front surface 52a, facing the X2 direction. The front surface 52a and the rear surface 52b both extend across the top end 52c and the bottom end 52d and across the left end 52e and the right end 52f.

The sheet 52 is formed of a light-transmissive, transparent base material 52m whose surface is partially coated with a non-light transmissive coating material 52n. That is, the sheet 52 includes the light-transmissive transparent region 52ra and a non-transparent region 52rb serving as an optical shield. In FIG. 3 and FIG. 4, the non-transparent region 52rb is represented by dot hatching. An outer edge 52raa (FIG. 3) of the transparent region 52ra surrounds the outer periphery Ala (FIG. 3) of the imaging region A1 of the camera 51. The transparent region 52ra works to allow light to be incident on the lens 51a. The non-transparent region 52rb is located outside the imaging region A1 to surround the transparent region 52ra.

The sheet 52 is further provided with through holes 52ga, 52gb, and 52gc penetrating the thickness of the sheet 52 (in X1 direction).

The operational member 53k is fitted into the through hole 52ga. The operational member 53k protrudes from the through hole 52ga. The through hole 52ga allows the shutter 53 to be partially visible from outside. In the closed position, the region 53rb of the shutter 53 faces the through hole 52ga, thereby indicating that the shutter 53 is located in the closed position (FIG. 4). In the open position, the region 53ra of the shutter 53 faces the through hole 52ga, thereby indicating that the shutter 53 is located in the open position (FIG. 3).

According to the electronic device including the elements as above, the user can press the operational member 53k of the shutter 53 to move the shutter 53 in the sliding direction to the closed position or the open position.

As described above, the electronic device 1 of the present embodiment includes the second casing 21 (container), the camera 51 accommodated in the second casing 21 and including the lens 51a on which light is to be incident from the outside of the second casing 21, the sheet 52 that covers the camera 51 from the light incident side of the lens 51a and allows the light to be incident on the lens 51a, and the shutter support 56 included in the second casing 21. The shutter support 56 supports the shutter 53, while attached thereto, such that the shutter 53 is slidable between the closed position in which the shutter 53 is located between the camera 51 and the sheet 52 to cover the incident side of the lens 51a to shield the lens 51a from the light, and the open position in which the shutter 53 exposes the lens 51a.

In the electronic device 1 with such a structure, the sheet 52 can serve to protect the camera 51 regardless of attachment or non-attachment of the shutter 53, therefore, the electronic device 1 is readily applicable to build-to-order manufacturing for allowing selection of attachment or non-attachment of the shutter 53. That is, the electronic device 1 may or may not include the shutter 53.

The electronic device 1 includes the shutter 53, for example.

According to the electronic device 1 with such a structure, in the closed position the shutter 53 works to shield the lens 51a from light, which enables improvement in security of the camera 51.

In the electronic device 1, for example, the sheet 52 includes the transparent region 52ra whose outer edge 52raa surrounds the outer periphery Ala of the imaging region A1 of the camera 51 and allows the light to be incident on the lens 51a; and the non-transparent region 52rb located outside the imaging region A1 to surround the transparent region 52ra. The shutter 53 is provided with the through hole 53p. In the open position the through hole 53p is located on the incident side of the lens 51a and faces the transparent region 52ra. The through hole 53p increases in diameter as further away from the lens 51a, and the outer periphery 53pa thereof surrounds the outer periphery Ala of the imaging region A1.

According to the electronic device 1 with such a structure, for example, it is possible to make misalignment between the sheet 52 and the camera 51 less noticeable, if it occurs.

In the electronic device 1, for example, the shutter 53 includes a base 53A of a strip plate form having the thickness along the optical axis Axl of the camera 51 and the length in the sliding direction of the shutter 53; the pair of first protrusions 53g located on one side of the central part 53t of the base 53A in the sliding direction, and extending away from each other from the base 53A along the short side of the base 53A to contact with the shutter support 56, and the pair of second protrusions 53h located on the opposite side of the central part 53t in the sliding direction, and extending away from each other from the base 53A along the short side of the base 53A to contact with the shutter support 56. The shutter support 56 slidably supports the base 53A through the pair of first protrusions 53g and the pair of second protrusions 53h such that the base 53A is movable between the closed position in which the base 53A is located between the camera 51 and the sheet 52 to cover the incident side of the lens 51a, and the open position in which the base 53A exposes the lens 51a.

According to electronic device 1 with such a structure, the shutter 53 can be prevented from rattling while moving, for example.

In the electronic device 1, for example, one of the shutter 53 and the shutter support 56 is provided with the positioning protrusion 53n while the other of the shutter 53 and the shutter support 56 is provided with the recess 56ga (first opening) into which the positioning protrusion 53n is fitted in the closed position of the shutter 53, and the recess 56gb (second opening) into which the positioning protrusion 53n is fitted in the open position of the shutter 53.

According to the electronic device 1 with such a structure, for example, the shutter 53 can be easily held in the closed position and the open position.

In the electronic device 1, for example, the shutter 53 includes the base 53A having the front surface 53a (first surface), facing the X1 direction (first direction) from the camera 51 to the sheet 52 along the optical axis Axl of the camera 51 and the rear surface 53b (second surface) opposite to the front surface 53a; and the operational member 53k that protrudes from the front surface 53a in the X1 direction. The shutter support 56 has the bottom surface 56a (surface) facing the front surface 53a of the shutter 53 in the X1 direction. One of the rear surface 53b of the shutter 53 and the bottom surface 56a of the shutter support 56 is provided with the positioning protrusion 53n. The other of the rear surface 53b of the shutter 53 and the bottom surface 56a of the shutter support 56 is provided with the recess 56ga (first opening) into which the positioning protrusion 53n is fitted in the closed position of the shutter 53, and the recess 56gb (second opening) into which the positioning protrusion 53n is fitted in the open position of the shutter 53.

According to the electronic device 1 with such a structure, the user can easily know the behavior of the shutter 53 at the time of the positioning protrusion 53n entering and exiting from the recess 56ga or the recess 56gb while pressing the operational member 53k in the direction opposite to the X1 direction (first direction) to move it in the sliding direction. That is, the user can feel clicking of the shutter 53 distinctively.

In the electronic device 1, for example, one of the second part 53sb of the shutter 53 and the shutter support 56 is provided with the positioning protrusion 53n extending along the thickness of the base 53A. The other of the second part 53sb of the shutter 53 and the shutter support 56 is provided with the recess 56ga into which the positioning protrusion 53n is fitted in the closed position of the shutter 53, and the recess 56gb into which the positioning protrusion 53n is fitted in the open position of the shutter 53.

According to the electronic device 1 with such a structure, the user can easily know the behavior of the shutter 53 at the time of the positioning protrusion 53n entering and exiting from the recess 56ga or the recess 56gb while pressing the operational member 53k in the direction opposite to the X1 direction to move it in the sliding direction. That is, the user can feel clicking of the shutter 53 distinctively.

Further, in the electronic device 1, for example, the shutter 53 includes the operational member 53k that is located at a connection 53sc between the first part 53sa and the second part 53*sb*, and protrudes from the base 53A in the direction from the camera 51 to the sheet 52 along the optical axis Axl of the camera 51.

According to the electronic device 1 with such a structure, the user can easily know the behavior of the shutter 53 at the time of the positioning protrusion 53*n* entering and exiting from the recess 56*ga* or the recess 56*gb* while pressing the operational member 53*k* in the direction opposite to the X1 direction to move it in the sliding direction. That is, the user can feel clicking of the shutter 53 distinctively.

In the electronic device 1, for example, the second casing 21 has the front surface 21*a* (outer surface). The shutter support 56 has the concave surface 56*y* into which the shutter 53 is inserted. The concave surface 56*y* includes lateral surfaces (the upper surface 56*b*, the lower surface 56*c*, the left surface 56*d*, and the right surface 56*e*) extending from the front surface 21*a* toward the interior of the second casing 21, and the bottom surface 56*a* connecting opposite sides of the lateral surfaces with respect to the front surface 21*a*. The lateral surfaces (the upper surface 56*b*, the lower surface 56*c*, the left surface 56*d*, and the right surface 56*e*) include the left surface 56*d* (inclined surface) inclined with respect to the bottom surface 56*a* such that the recess 56*h* surrounded by the concave surface 56*y* is widened as further away from the bottom surface 56*a*.

According to the electronic device 1 with such a structure, for example, the shutter 53 becomes easily insertable into the recess 56*h*.

In the electronic device 1, for example, the sheet 52 is provided with the through hole 52*ga* (viewing part) that allows the shutter 53 to be partially visible from outside. The shutter 53 includes the region 53*rb* (first region) facing the through hole 52*ga* in the closed position to indicate the shutter 53 being in the closed position, and the region 53*ra* (second region) facing the through hole 52*ga* in the open position to indicate the shutter 53 being in the open position.

According to the electronic device 1 with such a structure, the user can easily recognize the position of the shutter 53.

The above embodiment has described the example that the shutter 53 is provided with the positioning protrusion 53*n* and the shutter support 56 is provided with the recess 56*ga* (first opening) and the recess 56*gb* (second opening). However, the present embodiment is not limited thereto. For example, the shutter support 56 may be provided with the positioning protrusion 53*n* and the shutter 53 may be provided with the recess 56*ga* (first opening) and the recess 56*gb* (second opening). The first opening and the second opening may be both through holes.

According to one aspect of this disclosure, it is possible to provide an electronic device and a shutter of a novel structure that are applicable to build-to-order manufacturing for allowing selection of attachment or non-attachment of a shutter.

While certain embodiments have been described, these embodiments have been presented by way of example only, and are not intended to limit the scope of the inventions. Indeed, the novel methods and systems described herein may be embodied in a variety of other forms; various omissions, substitutions and changes in the form of the methods and systems described herein may be made without departing from the spirit of the inventions. Specifications including elements or shape (structure, kind, direction, form, size, length, width, height, number, layout, position, material, and else) can be modified when appropriate. The accompanying claims and their equivalents are intended to cover such forms or modifications as would fall within the scope and spirit of the inventions.

What is claimed is:

1. An electronic device comprising:
a container;
a camera comprising a lens on which light is to be incident from an outside of the container, the camera accommodated in the container;
a sheet that covers the camera from a light incident side of the lens and allows the light to be incident on the lens, wherein the sheet and the container are separate components of the electronic device;
a shutter comprising a pair of tabs; and
a shutter support included in the container, the shutter support that supports the shutter while attached to the container such that the shutter is slidable between a closed position and an open position, the closed position in which the shutter is located between the camera and the sheet to cover the light incident side of the lens and shield the lens from the light, the open position in which the shutter exposes the lens, the shutter support comprising a pair of through holes to receive the pair of tabs, wherein
the sheet includes:
a transparent region with an outer edge that surrounds an outer periphery of an imaging region of the camera, wherein the transparent region allows the light to be incident on the lens, and
a non-transparent region that is outside the imaging region and that surrounds the transparent region, and
the shutter is provided with a through hole that:
is located on the light incident side of the lens,
faces the transparent region in the open position of the shutter,
increases in diameter in a direction away from the lens, and
has an outer periphery that surrounds the outer periphery of the imaging region.

2. The electronic device according to claim 1, wherein the shutter includes:
a base of a strip plate form having a thickness along an optical axis of the camera and a length in a sliding direction of the shutter,
a pair of first protrusions located on one side of a central part of the base in the sliding direction, and extending away from each other from the base along a short side of the base to contact with the shutter support, and
a pair of second protrusions located on the other side of the central part in the sliding direction, and extending away from each other from the base along the short side of the base to contact with the shutter support, wherein
the shutter support supports the base through the pair of first protrusions and the pair of second protrusions such that the base is slidable between a closed position and an open position, the closed position in which the base is located between the camera and the sheet to cover the light incident side of the lens, the open position in which the base exposes the lens.

3. The electronic device according to claim 1, wherein one of the shutter and the shutter support is provided with a positioning protrusion, and
the other of the shutter and the shutter support is provided with:
a first opening into which the positioning protrusion is fitted in the closed position of the shutter, and
a second opening into which the positioning protrusion is fitted in the open position of the shutter.

4. The electronic device according to claim 1, wherein the shutter includes:
   a base having a first surface facing a first direction from the camera to the sheet along an optical axis of the camera, and a second surface opposite to the first surface, and
   an operational member that protrudes from the first surface in the first direction, the shutter support has a surface facing the first surface of the shutter in the first direction,
one of the second surface of the shutter and the surface of the shutter support is provided with a positioning protrusion, and
the other of the second surface of the shutter and the surface of the shutter support is provided with:
   a first opening into which the positioning protrusion is fitted in the closed position of the shutter, and
   a second opening into which the positioning protrusion is fitted in the open position of the shutter.

5. The electronic device according to claim 1, wherein the shutter includes a base of a strip plate form having a thickness along an optical axis of the camera and a length in the sliding direction,
the base includes a first part and a second part juxtaposed to each other along the length, the second part being thinner in thickness than the first part, one of the second part of the shutter and the shutter support is provided with a positioning protrusion extending along the thickness of the base, and
the other of the second part of the shutter and the shutter support is provided with:
   a first opening into which the positioning protrusion is fitted in the closed position of the shutter, and
   a second opening into which the positioning protrusion is fitted in the open position of the shutter.

6. The electronic device according to claim 5, wherein the shutter includes an operational member that is located at a connection between the first part and the second part, and protrudes from the base along the optical axis of the camera in a direction from the camera to the sheet.

7. The electronic device according to claim 1, wherein the container has an outer surface,
the shutter support has a concave surface into which the shutter is inserted, the concave surface including a plurality of lateral surfaces extending from the outer surface toward an interior of the container, and a bottom surface that connects opposite sides of the lateral surfaces with respect to the outer surface, and
the lateral surfaces include an inclined surface inclined with respect to the bottom surface such that a recess surrounded by the concave surface is widened as further away from the bottom surface.

8. The electronic device according to claim 1, wherein the sheet includes a viewing part that allows the shutter to be partially visible from outside, and
the shutter includes:
   a first region that faces the viewing part in the closed position of the shutter, to indicate the shutter being in the closed position, and
   a second region that faces the viewing part in the open position of the shutter, to indicate the shutter being in the open position.

9. The electronic device according to claim 1, wherein the sheet is formed of a light-transmissive transparent base material and the surface of the sheet is partially coated with a non-light transmissive coating material.

10. A shutter for use in an electronic device, the electronic device comprising
the shutter,
a container,
a camera accommodated in the container and comprising a lens on which light is to be incident from an outside of the container,
a sheet that covers the camera from a light incident side of the lens, and allows the light to be incident on the lens, the sheet and the container being separate components of the electronic device, and
a shutter support included in the container, the shutter comprising:
   a pair of tabs,
   a base of a strip plate form having a thickness along an optical axis of the camera and a length in a direction intersecting with the optical axis,
   a pair of first protrusions located on one side of a central part of the base in the intersecting direction, and extending away from each other from the base along a short side of the base to contact with the shutter support, and
   a pair of second protrusions located on the other side of the central part in the intersecting direction, and extending away from each other from the base along the short side of the base to contact with the shutter support, wherein
the base is supported by the shutter support through the pair of first protrusions and the pair of second protrusions such that the base is slidable between a closed position and an open position in the intersecting direction, the closed position in which the base is located between the camera and the sheet to cover the lens from the light incident side and shield the lens from the light, the open position in which the base exposes the lens,
the shutter support comprises a pair of through holes to receive the pair of tabs,
the sheet includes:
   a transparent region with an outer edge that surrounds an outer periphery of an imaging region of the camera, wherein the transparent region allows the light to be incident on the lens, and
   a non-transparent region that is outside the imaging region and that surrounds the transparent region, and
the shutter is provided with a through hole that:
   is located on the light incident side of the lens,
   faces the transparent region in the open position of the shutter,
   increases in diameter in a direction away from the lens, and
   has an outer periphery that surrounds the outer periphery of the imaging region.

* * * * *